US008560359B2

(12) United States Patent
Salle et al.

(10) Patent No.: US 8,560,359 B2
(45) Date of Patent: *Oct. 15, 2013

(54) SYSTEM AND METHODS FOR MODELING CONSEQUENCES OF EVENTS

(75) Inventors: Mathias Salle, San Francisco, CA (US); Yassine Faihe, Champagnier (FR); Abdel Boulmakoul, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 848 days.

This patent is subject to a terminal disclaimer.

(21) Appl. No.: 12/262,240

(22) Filed: Oct. 31, 2008

(65) Prior Publication Data

US 2010/0114621 A1 May 6, 2010

(51) Int. Cl.
*G06Q 10/00* (2012.01)
(52) U.S. Cl.
USPC .......................................... 705/7.11; 705/7.37
(58) Field of Classification Search
USPC ................................................. 705/7.11, 7.37
See application file for complete search history.

(56) References Cited

U.S. PATENT DOCUMENTS

| | | | |
|---|---|---|---|
| 6,871,183 B2 | 3/2005 | Gilday et al. | |
| 7,711,670 B2 * | 5/2010 | Roediger | 706/46 |
| 2002/0099598 A1 | 7/2002 | Eicher, Jr. et al. | |
| 2002/0099678 A1 | 7/2002 | Albright et al. | |
| 2002/0143790 A1 | 10/2002 | Qian | |
| 2004/0068431 A1 * | 4/2004 | Smith et al. | 705/10 |
| 2005/0096950 A1 * | 5/2005 | Caplan et al. | 705/7 |
| 2005/0256752 A1 | 11/2005 | Ramachandran et al. | |
| 2006/0059113 A1 * | 3/2006 | Kuznar et al. | 706/45 |
| 2006/0143116 A1 | 6/2006 | Sumner et al. | |
| 2006/0242001 A1 * | 10/2006 | Heathfield | 705/10 |
| 2007/0118419 A1 | 5/2007 | Maga et al. | |
| 2007/0136788 A1 | 6/2007 | Monahan et al. | |
| 2007/0226231 A1 * | 9/2007 | Venkat | 707/100 |
| 2008/0154679 A1 * | 6/2008 | Wade | 705/7 |
| 2008/0183786 A1 * | 7/2008 | Shimizu | 708/250 |
| 2008/0209029 A1 * | 8/2008 | Bhattacharya et al. | 709/224 |
| 2008/0294471 A1 * | 11/2008 | Gupta et al. | 705/7 |
| 2009/0157465 A1 * | 6/2009 | Heathfield | 705/8 |

OTHER PUBLICATIONS

Aib, Issam; Salle, Mathias; Bartolini, Claudio; Boulmakoul, Abdel, "A Business Driven Management Framework for Utility Computing Environments", HPL-2004-171, HP Labs Bristol, 2004.*
Altiris® 6 Connector for HP OpenView, 2005, downloaded Sep. 4, 2011 from http://www.symantec.com.*

(Continued)

*Primary Examiner* — Lynda Jasmin
*Assistant Examiner* — George H Walker (57) ABSTRACT

Methods, systems, and computer program products are provided for modeling consequences of events on performance indicators. A causality model is provided to define relationships between events and the consequences associated with each one of the events to modify a value of at least one of the performance indicators associated with each one of the events. An algorithm included in the causality model is executable to compute an impact of the consequences on the value. A causality model management system is provided to manage the causality model, including storing, execution of the algorithm, interfacing with other systems, and simulating what-if scenarios of the events and the performance indicators.

20 Claims, 6 Drawing Sheets

(56) References Cited

OTHER PUBLICATIONS

Richard Lau and Ram Khare "Service Model and Its Application to Impact Analysis." In Service Assurance with Partial and Intermittent Resources. Petre Dini, Pascal Lorenz and José de Souza,Eds., Lecture Notes in Computer Science, 2004, Springer Berlin / Heidelberg Isbn:978-3-540-22567-6, Url: http://dx.doi.org/10.1007/978-3-540-27767-5_12.*

Alexander Komashie and Ali Mousavi. "Modeling Emergency Departments Using Discrete Event Simulation Techniques," In Proceedings of the 2005 Winter Simulation Conference,M. E. Kuhl, N. M. Steiger, F. B. Armstrong, and J. A. Joines, eds.*

Derek Miers, Paul Harmon and curt Hall. "The 2007 BPM Suites Report, webMethods Fabric 7.0." Downloaded from http://www.bptrends.com/publicationfiles/06-07-BPMS%20Cov-webMethods.pdf Sep. 6, 2011.*

Aib, I.; Salle, M.; Bartolini, C.; Boulmakoul, A,; Boutaba, R.; Pujolle, G.; , "Business aware Policy-based Management," Business-Driven IT Management, 2006. BDIM '06. The First IEEE/IFIP International Workshop on, pp. 55-62, Apr. 7-7, 2006 doi: 10.1109/BDIM.2006.1649211.*

Tudor Dumitraş ,Daniela Roşu, Asit Dan, and Priya Narasimhan. "Impact-Sensitive Framework for Dynamic Change-Management" In Supplemental Proceedings, 2006 International Conference on Dependable Systems and Networks (DSN), pp. 94-99, Jun. 25-28, 2006, Philadelphia, PA.*

"HP OpenView Operations for Windows 7.1x/7.2x and HP OpenView Service Desk 4.5" downloaded Sep. 4, 2011 from http://www.openview.hp.com/products/operations_for_windows/twp/ovowin_twp_sdesk_integrate_mar04.pdf.*

C. Bartolonini, M. Salle, A. Boulmakoul, S. Sabiani, and J. M. Bronoel. "IT Service Incidents Prioritization driven by Business Objectives." In Bruno F. Marques, Thomas Nebe, and Raul F. Oliveira, editors, Proceedings of the 12th Annual Workshop of HP OpenView University Association, pp. 29-41, 2005. http://www.hpovua.org.*

Bartolini et al, "Business Driven Prioritization of Service Incidents", 15th IFIP/IEEE Distributed Systems: Operations and Management, Nov. 15-17, 2004, Davis, CA, USA.*

IBM. Best Practices for Using WebSphere Business Modeler and Monitor. IBM Redbooks Paper, 2006. Downloaded from http://www.redbooks.ibm.com/redpapers/pdfs/redp4159.pdf on Sep. 6, 2011.*

Derek Miers, Paul Harmon and curt Hall. "The 2007 BPM Suites Report, webMethods Fabric 7.0." Downloaded from http://www.bptrends.com/publicationfiles/06-07-BPMS%20Cov-webMethods.pdf Sep. 6, 2011.*

C. Bartolonini, M. Salle, A. Boulmakoul, S. Sabiani, and J. M. Bronoel. "IT Service Incidents Prioritization driven by Business Objectives," In Bruno F. Marques, Thomas Nebe, and Raul F. Oliveira, editors, Proceedings of the 12th Annual Workshop of HP OpenView University Association, pp. 29-41, 2005. http://www.hpovua.org.*

IBM. Best Practices for Using WebSphere Business Modeler and Monitor. IBM Redbooks Paper, 2006. Downloaded from http://www.redbooks.ibm.com/redpapers/pdfs/redp4159.pdf on 9/06/1.*

Alan Lundberg. "Leverage Complex Event Processing to Improve Operational Performance." Business Intelligence Journal,Jan. 2006 • vol. 11, No. 1.*

Derek Miers, Paul Harmon and curt Hall. "The 2007 BPM Suites Report, webMethods Fabric 7.0." Downloaded from http://www.bptrends.com/publicationfiles/06-07-BPMS%20Cov-webMethods.pdf Sep. 6, 2011.*

Aldo Montesano. "Risk and Uncertainty Aversion with Multidimensional Consequences." Revista de la Real Academia de Ciencias ExactasFis.Nat. (Esp), vol. 93, N. 4, pp. 425-437, 1999, Monográfico: Problemas complejos de decisión. II, downloaded Dec. 12, 2012 from http://dmle.cindoc.csic.es/pdf/RRACEFN_1999_93_04_03.pdf.*

Christian P.Traeger. Intertemporal Risk Aversion, Stationarity and Discounting, Jobmarket Paper, Oct. 2007, downloaded Dec. 12, 2012 from http://emlab.berkeley.edu/users/webfac/szeidl/e208_f07/traeger.pdf.*

Bartolini, C.; Salle, M.; Trastour, D.; , "IT service management driven by business objectives An application to incident management," Network Operations and Management Symposium, 2006. NOMS 2006. 10th IEEE/IFIP , vol., No., pp. 45-55, Apr. 3-7, 2006 doi: 10.1109/NOMS.2006.1687537 URL: http://ieeexplore.ieee.org/stamp/stamp.jsp?tp=&arnumber=1687537&.*

Marco Gero Fernández, Carolyn Conner Seepersad, David W. Rosen, and Janet K. Allen. "Decision Support in Concurrent Engineering—The Utility-Based Selection Decision Support Problem", Concurrent Engineering vol. 13, No. 1, Mar. 2005, p. 13-27. doi: 10.1177/1063293X05050912.*

* cited by examiner

SYSTEM AND METHODS FOR MODELING CONSEQUENCES OF EVENTS

CROSS REFERENCE TO RELATED APPLICATIONS

This Application claims the benefit of U.S. Provisional Application Ser. No. 61/022,495, filed Jan. 21, 2008, titled "System And Methods For Modeling Consequences Of Events" which is hereby incorporated by reference herein as if reproduced in full below.

BACKGROUND OF THE INVENTION

Over the last few years, information technology (IT) organizations have increasingly adopted standards and best practices to ensure efficient IT service delivery. In this context, the IT Infrastructure Library (ITIL) has been rapidly adopted as the de facto standard. ITIL defines a set of standard processes for the management of IT service delivery organized in processes for Service Delivery (Service Level Management, Capacity Management, Availability Management, IT Continuity Management and Financial Management) and Service Support (Release Management, Configuration Management, Incident Management, Problem Management and Change Management). The Service Support processes, such as Configuration Management, Incident Management, and Configuration Management are some of the more common processes IT organizations have implemented to bring their service to an acceptable level for their businesses.

The implementation of ITIL processes has yielded significant results to IT organizations by defining clear interfaces between service providers and consumers, by clarifying the IT organizational structures, roles, and responsibilities, and by designing internal processes for the management of IT operations. However, once ITIL processes are implemented, the effectiveness of the IT organization depends on the ability of the decision makers involved in those processes to make timely and accurate decisions. Hence, regardless of the quality of the process implementation, if inadequate decisions are made during the execution of those processes, they will result in poor customer experience and low value delivery. For instance, being able to prioritize a large volume of incidents based on their likely impact on the IT organization is key to running an efficient Incident Management process.

The challenge facing IT Service Management is to develop decision support capabilities that will enable decision makers to drive their management processes efficiently. An organizational structure and processes referred to as IT Governance can be used to define the strategy of the IT organization and oversee its execution to achieve the goals of the enterprise. One of the goals of IT Governance is to deliver IT services in alignment with business objectives. The business objectives are used as input to derive goals, objectives, and performance metrics needed to manage IT effectively. Auditing processes are used to measure and analyze the performance of the organization. A concept referred to as the Balanced Scorecard combines financial measures and non-financial measures in a single report and has been used as a strategic and performance measurement tool for IT Governance. However, the development of the balanced scorecard has been focused on the structural aspects (including design processes, metric selection, and ranking) and on the reporting aspects (including metric collection and ranking). The further development and use of the balanced scorecard to drive business decisions within an enterprise to align business strategy with IT operations has been limited.

SUMMARY

The teachings of the present disclosure relate to methods, systems, and computer program products for modeling consequences of events on performance indicators. Described herein are several methods, systems, and computer program products for developing a causal model capable of determining the consequences of events on performance indicators. A causality model is provided to define relationships between events and the consequences associated with each one of the events to modify a value of at least one of the performance indicators associated with each one of the events. An algorithm included in the causality model is executable to compute an impact of the consequences on the value. A causality model management system is provided to manage the causality model, including storing, execution of the algorithm, interfacing with other systems, and simulating what-if scenarios of the events and the performance indicators.

BRIEF DESCRIPTION OF THE DRAWINGS

Embodiments of the invention relating to both structure and method of operation may best be understood by referring to the following description and accompanying drawings.

DETAILED DESCRIPTION

Applicants recognize that it would be desirable to provide a causal framework that would include tools and techniques to make business decisions under uncertainty that would leverage the use of balanced scorecard in selecting alternatives, thereby ensuring alignment between business strategy and IT operations, including IT services and IT infrastructure. That is, it would be desired to provide tools and techniques that would evaluate various business alternatives under risk in quantifiable terms and assess their impact on the objectives identified in the balanced scorecard. Applicants further recognize that the selection of a particular alternative from a set of alternatives is a multi criteria decision making (MCDM) problem under uncertainty when criteria are modeled as objectives in balanced scorecards. Therefore, a need exists to provide improved tools and techniques to be used in decision support systems for modeling consequences of events on performance indicators, and hence on balanced scorecards.

The following terminology may be useful in understanding the present disclosure. It is to be understood that the terminology described herein is for the purpose of description and should not be regarded as limiting.

Framework—A basic structure designed to provide one or more functions. A framework used in a computer hardware and software environment may be typically designed to include processes to deliver core functions and extensible functions. The core functions are typically a portion of the framework that may not be modifiable by the framework user. The extensible functions are typically a portion of the framework that has been explicitly designed to be customized and extended by the framework user as a part of the implementation process. For example, Control Objectives for Business Information-related Technology (COBIT) is a type of a framework used for addressing the management's need for control and measurability of IT services. The framework may also include application program interfaces that allow an external program to access the functions of the framework.

Balanced Scorecard—A collection of key measures (financial and non-financial) introduced by Robert Kaplan and David Norton that an enterprise may define to measure its performance in executing a strategy and 'balance' the business perspective with the IT service perspective. A typical balanced scorecard may include 4 perspectives (a perspective may be defined as a group or combination of objectives pertaining towards a particular function of the business), including financial, customer, business process, and learning/growth perspectives. A generalized balanced score card may include a set of n perspectives.

Key performance indicator (KPI) (or simply a performance indicator)—KPI is an actionable metric. As defined by COBIT, KPI's are measurable indicators of performance of the enabling factors of IT processes, indicating how well the process enables the goal to be reached.

Objectives—Measurable indicators of the business objectives. The objectives typically express one or more target values over a KPI.

Lottery—A lottery is a type of gaming process that awards prizes based on the element of probability or chance. If Z is a finite set of consequences (or prizes or outcomes), then a lottery is a probability distribution on Z.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system.

Systems and methods disclosed herein provide an open model for expressing declaratively causal relationships between IT events and performance indicators. The model is said to be open because the framework provides for different styles of consequences to be expressed through the concept of "modifier". A modifier can be a probability distribution expressed over a range of key performance indicators (KPI's). Therefore, a consequence expresses how events are likely to modify the values of KPI's.

Management of Information Technology Infrastructure Library (ITIL) processes can be based on objectives defined in balanced scorecards to help ensure that IT management decisions and processes are aligned with business objectives. In terms of decision theory, criteria modeled as balanced scorecard objectives presents a multi-criteria decision making (MCDM) problem under uncertainty. Cost functions, utility functions or other means to assess or compare alternatives are defined to achieve efficient, business driven prioritization and scheduling. The functions measure the impact of IT management alternatives against the objectives defined in a balanced scorecard.

Model for Balanced Scorecard
Generalized Scorecard

Figure 1:
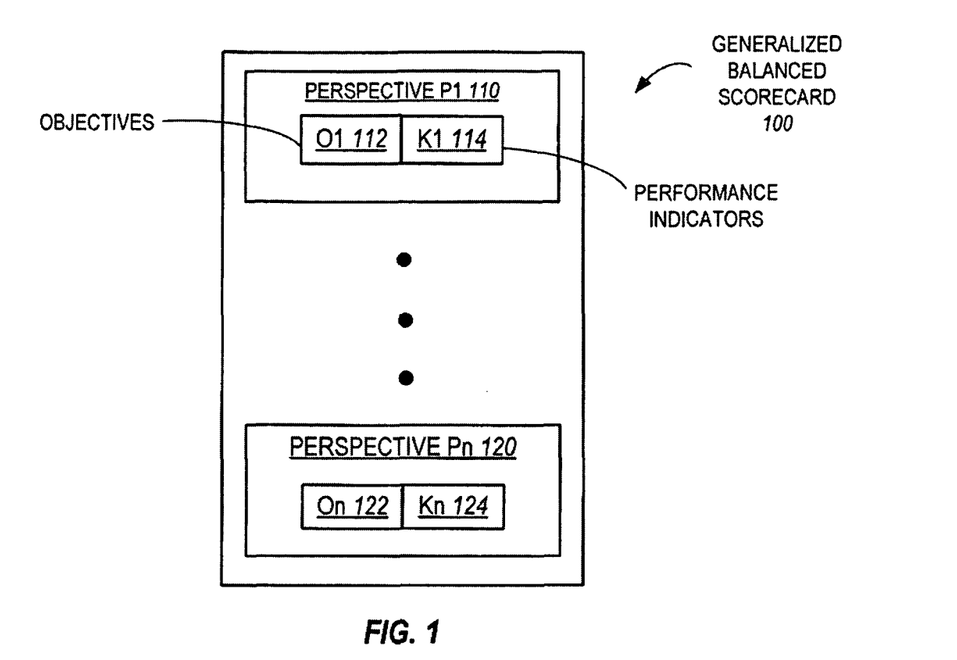
FIG. 1 illustrates an exemplary structure of a generalized balanced scorecard 100, according to an embodiment.

Given a set A of IT management alternatives, a preference relation over the element of A is defined based on the relationship between alternatives and their impact on scorecard objectives. FIG. 1 illustrates an exemplary structure of a generalized balanced scorecard 100, according to an embodiment. The generalized balanced scorecard 100 may include the following:

A set of perspectives $P=\{P_1\ 110, \ldots, P_n\ 120\}$

A set of related weights $Z=\{\zeta_1, \ldots, \zeta_n\}$; where each $\zeta_i$, $(1 \le i \le n)$ is the relative weight of the $i^{th}$ perspective in P and $\Sigma_{i=1}^{n} \zeta_i = 1$ An evaluation period Tp A perspective can be formally defined as:

A set of objectives $O=\{O_1\ 112, \ldots, O_n\ 122\}$

A set of related weights $\Omega=\{\omega_1, \ldots, \omega_n\}$: where each $\omega_i$, $(1 \le i \le n)$ is the relative weight of the $i^{th}$ objective in O and $\Sigma_{i=1}^{n} \omega_i = 1$ The set of all available performance indicators (also referred to more generally as metrics) $K=\{\kappa_i\ 114, \ldots, \kappa_n\ 124\}$ and the set of domain values $D=\{D_1, \ldots, D_n\}$ where each $D_i$, $(1 \le i \le n)$ is a finite set of possible values for performance indicator $\kappa_i$. D will also be used to denote the space of all possible outcomes, which is the Cartesian product of $D=D_1 \times D_2 \times \ldots \times D_n$.

An objective $O_i$, $(1 \le i \le n)$ was defined above as a constraint expressed over an element $\kappa_j$ of the set K and an element of its associated domain value $D_j$. Constraints in scorecards admit two comparators, ("below" or "lower than") and ("above" or "greater than").

The generalized scorecard model, with a constraint approach to the definition of the objective is specifically useful for activities such as scorecard performance monitoring and reporting. However, for decision support, the definition of an objective as a constraint is too limited. Accordingly, a utilitarian approach to the definition of scorecard objectives may be taken.

Utilitarian Scorecard

As described in the previous section, a scorecard perspective is a set of objectives over which a preference function is defined. An objective is a constraint expressed between a performance indicator and an element of its domain value. In a utilitarian approach, a scorecard objective can be treated as a utility function expressing a decision maker's preference over the domain values of a performance indicator.

For example, a scorecard objective such as "The overall service level agreement (SLA) penalty cost should be less than $100000" expresses a constraint over the domain values of the performance indicator "overall penalty cost". Any value above the target value ($100000) would not meet the constraint while any value below would. In other words, the constraint expressed in the scorecard objective partitions the set D of domain values of a performance indicator $\kappa$ into two subsets, the subset S containing the values that satisfy the constraint and the subset NS containing the values that do not.

PROPOSITION 1. A scorecard objective expresses a decision maker's preference over the domain values of the associated performance indicator.

Because all the values contained in the S subset satisfy the constraint, from a decision maker point of view, they all yield that same degree of satisfaction. As long as the constraint is satisfied, any value of the performance indicator is as good as the other. On the other hand, would a decision maker be equally dissatisfied by the values in NS that do not satisfy the constraint, or would a decision maker would prefer values of the performance indicator that are "close" to the objective than values that are "far" from the objective.

Therefore, there exists a preference relation $\succ o$ ("is preferred with regards to objective o") over the set D of domain values of a performance indicator κ and that this preference is expressed in reference to a target value in D and the constraint operator ("greater than" or "lower than") associated with the related objective.

PROPOSITION 2. The preference relation $\succ o$ can be represented by a von Neumann-Morgenstern utility function.

The preference relation $\succ o$ is rational, that is:
(A.1) $\succ o$ is complete, e.g., either $p \succ o\, q$ or $q \succ o\, p$ for all $p, q \in D$
(A.2) $\succ o$ is transitive, e.g., if $p \succ o\, q$ and $q \succ o\, r$ then $p \succ o\, r$ for all $p, q, r \in D$ Given the properties of the preference relation $\succ o$, let $\phi_o : D \to [0,1]$ be a utility function representing the preference relation $\succ o$ such that:

$$\forall x, y \in D : x \succ_o y \Rightarrow \phi_o(x) \geq U_0(y) \qquad \text{Equation 100}$$

Based on the scorecard structure, mutual utility independence between the utility functions representing the various objectives is assumed.

PROPOSITION 3. The utility function $\phi_o(.)$ representing the preference relationship expressed in the context of an objective o can be derived from the objective's constraint operator, the target value and the risk attitude of the decision maker.

Figure 2:
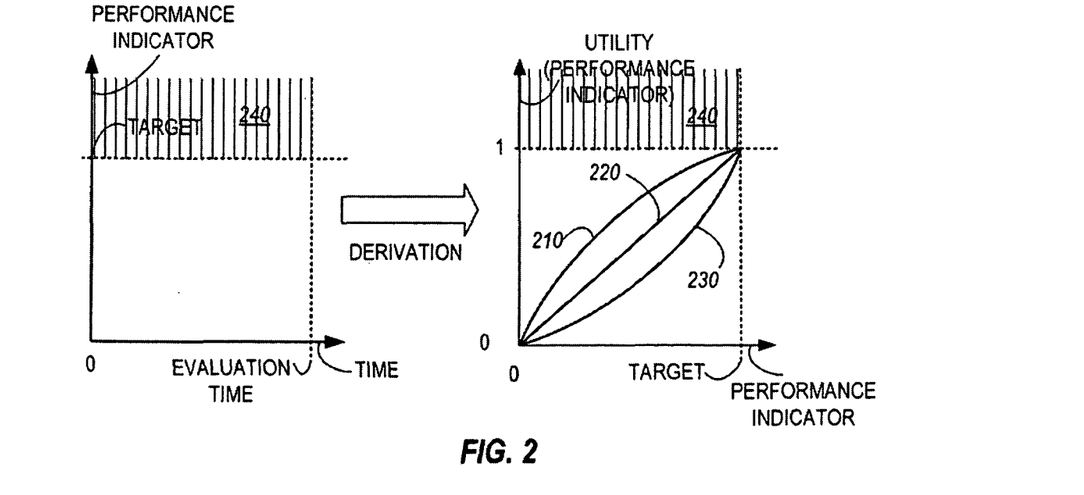
FIG. 2 describes a diagram illustrating a derivation process of a utility function having a 'greater than' type objective, according to an embodiment.

FIG. 2 describes a diagram illustrating a derivation process of a utility function having a 'greater than' type objective, according to an embodiment. For 'greater than' operator, a utility function is risk averse 210 if it is concave downward over the continuum in question. It is risk seeking 230 if it is concave upwards over the continuum, and it is risk neutral 220 if it is linear over the continuum. The shaded area 240 represents the values in the performance indicator space that satisfy the objective at any point in time. The derived utility functions for a performance indicator values at a given time t, with t less than or equal to Evaluation time exhibit different risk postures with regards to the 'greater than operator'. Similarly, for a 'lower than' operator (not shown), a utility function is risk averse if it is concave upwards over the continuum in question. It is risk seeking if it is concave downward over the continuum, and it is risk neutral if it is linear over the continuum. Various utility functions used may include hyperbolic absolute risk aversion (HARA) function, polynomial and spline functions.

PROPOSITION 4. The utility of a scorecard is calculated as a weighted sum of the objectives utility functions.

In a scorecard, objectives are clustered into perspectives (financial, customer, internal, and others). Relative importance of objectives in a perspective is determined by a weight with sum of the weights equal to one. Similarly, importance of the perspective in a scorecard is also determined by a weight. To capture this, a utility function associated with an objective o in a perspective p is associated with a weight $\omega_0$ with:

$\omega_0$ = weight of objective o in perspective x weight of perspective p in scorecard with $$\sum_{i=1}^{n} \omega_{oi} = 1,$$

the summation occurring for values of i from 1 to n. The utility of a scorecard s with n objectives is computed by Equation 200 as follows:

$$\sigma(s) = \sum_{i=1}^{n} \omega_{oi} \varphi_{oi}.$$

Figure 3:
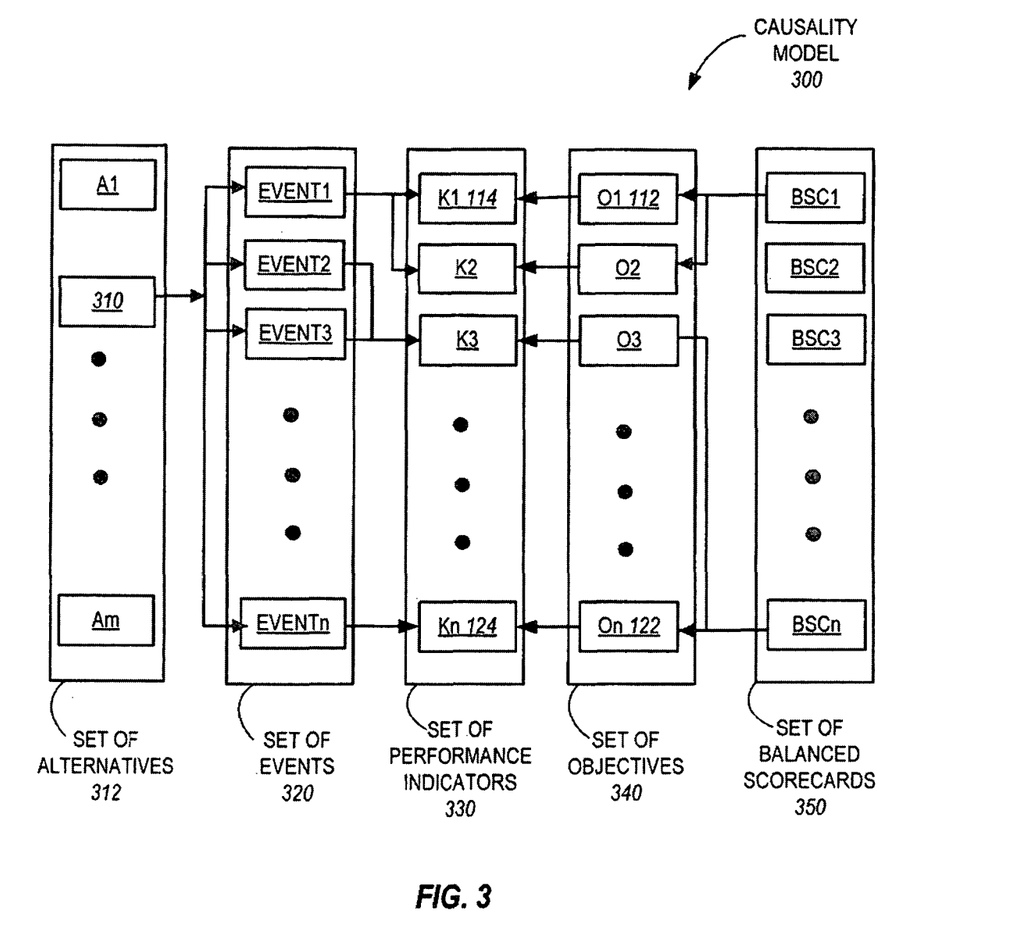
FIG. 3 is a block diagram of a causality model illustrating a causal relationship between sets of an alternative, event, performance indicator, objective and balanced scorecard, according to an embodiment.

Impact of Business Decision Alternatives on Performance Indicators and Balanced Scorecards FIG. 3 is a block diagram of a causality model 300 illustrating a causal relationship between sets of an alternative, event, performance indicator, objective and balanced scorecard, according to an embodiment. An alternative 310 selectable from a set of alternatives 312 results in a set of events 320 which in turn have specific consequences (or outcomes) on a set of performance indicators 330. A change in the values of the set of performance indicators 330 affect the set of objectives 340, which in turn affect the set of balanced scorecards 350. Additional details of an exemplary representation of the causality model 300 using a unified modeling language (UML) is described with reference to FIG. 6.

To illustrate the causality relationship, a scenario may exist in which a decision maker may desire to prioritize Information Technology (IT) incidents and that Service Level Agreements (SLA's) have been defined on the incident management process specifying specific times for the treatment of such IT incidents. For instance, a gold SLA may specify that incidents be treated within 4 hours of reception. A given alternative would associate a priority to a specific incident resulting in an expected time of treatment. For example, a 'High' priority may guarantee a time of treatment of 1 hour, plus or minus 15 minutes. If the expected time of treatment is after the deadline computed form the SLA, the following event may be generated: violation of associated service level agreement (SLA). This event results in a unit increase for the performance indicator measuring customer satisfaction and an increase of the penalty cost associated with the SLA for the performance indicator measuring the total penalty cost.

In this example, there is an uncertainty over the time (e.g., plus or minus 15 minutes) of treatment of the incidents. In other words, the consequences of assigning a given priority to an incident results in uncertain consequences or outcomes. Thus, an alternative is equivalent to a set of simultaneous independent lotteries or prospects defined as probability distributions over the domain values of the set of performance indicators 330. As described earlier, if Z is a finite set of consequences (or prizes or outcomes), then a lottery is a probability distribution on Z.

Given a set of m alternatives included in the set of alternatives 312, $$A_i = \{L^i_1, \ldots, L^i_n\} \qquad \text{Equation 300}$$

where $A_i$, $(1 \leq i \leq m)$ is the $i^{th}$ alternative and $L^i_j$, $(1 \leq j \leq n)$ is the lottery on the $j^{th}$ performance indicator for the $i^{th}$ alternative. For discrete values of the performance indicator, the probability density function is replaced with the probability masses represented by (p1, x1; ... ; pn, xn) meaning that probability pj is assigned to outcome xj, for j=1, ..., n. The probabilities pj are nonnegative and sum to one. Without loss of generality and for simplification, the performance indicators are assumed to be discrete. To determine the optimum alternative, the solution defines a preference structure over the set of alternatives 312.

Figure 4:
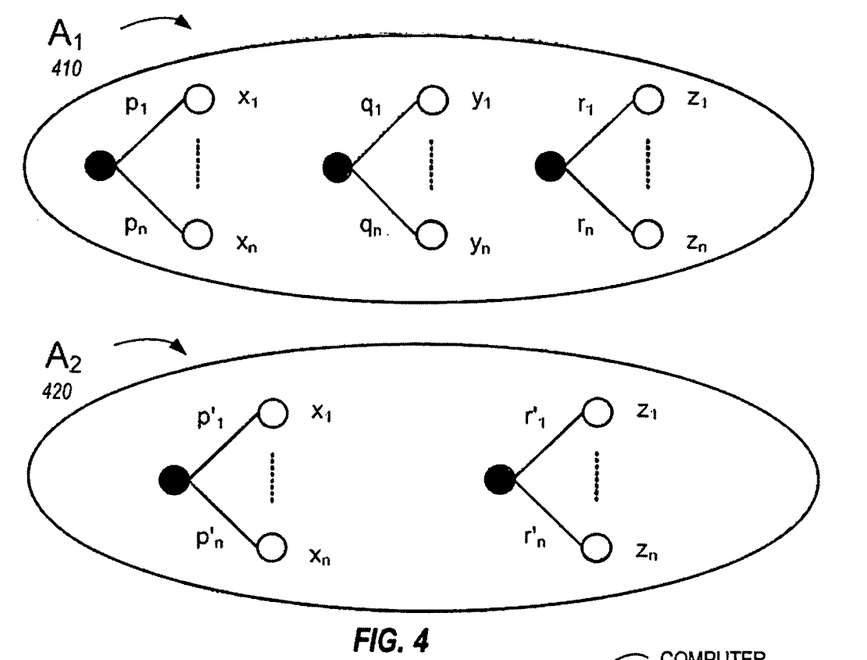
FIG. 4 is a graphical illustration of decision alternatives configured as a set of lotteries, according to an embodiment.

FIG. 4 is a graphical illustration of decision alternatives configured as a set of lotteries, according to an embodiment. The decision maker may select any two alternatives A1 410 and A2 420 from the set of alternatives 312 for comparison. The first alternative, A1 410, is composed of three concurrent lotteries respectively over the consequences or outcomes {x, y, z}. The second alternative, A2 420, is composed of two concurrent lotteries over the consequences or attributes {x, z}. In order to select an optimum alternative between A1 410 and A2 420, the decision maker establishes a preference between those two alternatives. Since the outcomes of the two concurrent lotteries are different, the preference between lotteries is restated or reformulated in terms of preferences between probability distributions over the same set of outcomes by homogenizing or adjusting the set of outcomes accordingly. One such technique for homogenizing the set of outcomes is by using a degenerate lottery, which assigns a known probability of 1 or a 0 to a current value of an outcome.

Therefore, alternative A2 420, can be reformulated over the three attributes {x, y, z} by introducing a degenerate lottery on y, which is a simple lottery that assigns probability 1 to the current value of performance indicator y, and 0 to all others. The two alternatives A1 410 and A2 420 can now be compared after the homogenization process. A decision making situation in which a decision maker or a decision support system can assign mathematical probabilities to the randomness is referred to as a situation under risk or an uncertain situation. In such a case, the behavior of the decision maker is fully defined by its preferences on the probability distributions over the consequences of the alternatives. Therefore, the decision to select an alternative from the set of alternatives 312 is equivalent to defining a preference relation over a set of concurrent lotteries: $\{\{L^1_1, \ldots, L^1_n\}, \ldots, \{L^m_1, \ldots, L^m_n\}\}$.

Preferences Over Concurrent Lotteries Under Risk

Figure 5:
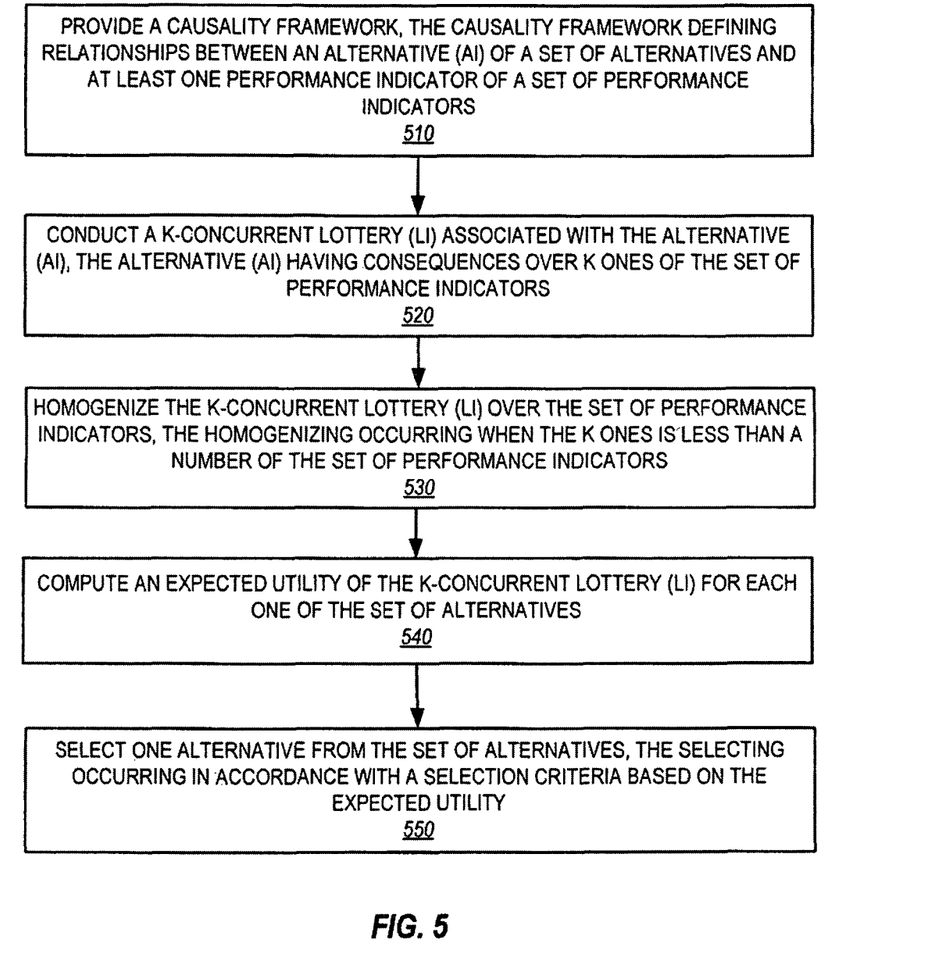
FIG. 5 is a flow chart of a method for decision making under uncertainty, according to an embodiment.

FIG. 5 is a flow chart of a method for decision making under uncertainty, according to an embodiment. In a particular embodiment, the method is used to compare alternatives under risk, e.g., the set of alternatives 312, based on the balanced scorecard 100. In order to compare a set of concurrent lotteries, a preference relation over such lotteries is established. To achieve this, the expected utility of a simple lottery over a performance indicator is assessed. Then, using the additive properties of the utility functions derived from a scorecard, the expected utilities over each of the lotteries are aggregated. The result is the expected utility associated with that set of concurrent lotteries. Assuming that the preferences are in accordance with the von Neumann-Morgenstern axioms, the preference relation over concurrent lotteries can be represented by the aggregation of the expected utilities over simple lotteries.

A. Concurrent Lottery

DEFINITION 1. Let X be a set of variables. A k-concurrent lottery is a set of k (k=card(X)) simultaneous independent simple lotteries over each element of X.

DEFINITION 2. Let X be a set of variables and let Y, Z be two random subsets of X, with Y not equal to 0 and Z not equal to 0. Let Ly be a concurrent lottery defined over Y and Lz be concurrent lottery defined over Z. $L^y$ and $L^z$ are homogeneous if, and only if, Y=Z.

DEFINITION 3. Let X be a set of variables and let x={x1, ..., xn} be the valuation of the variables in X at time t.

Let Lx be an n-concurrent lottery over X at time t. The values in x are said to represent the status quo for Lx.

PROPOSITION 5. Let X be a set of variables and let Y, Z be two random subsets of X, with Y not equal to 0, Z not equal to 0 and Y not equal to Z. Let Ly be a concurrent lottery defined over Y and $L^z$ be concurrent lottery defined over Z. $L^y$ and $L^z$ are homogenized by adding to $L^y$ the degenerated lotteries on the status quo values of Z\Y and by adding to $L^z$ the degenerated lotteries on the status quo values of Y\Z.

B. Expected Utility of a Simple Lottery Over a Performance Indicator

Based on the results described in the section entitled MODEL FOR BALANCED SCORECARD, the expected utility (EU) for of a simple lottery L over a performance indicator K is computed by equation 400 as follows:

$$EU(L^k) = \sum_{i=1}^{n} p_i \varphi_{ok}(x_i) \qquad \text{(Eq. 400)}$$

where $\phi_{ok}(.)$ is the utility function derived from objective o defined over performance indicator k as described in Equation 100. $\phi_{ok}(x_i)$ is the utility of consequence or outcome $x_i$ and $p_i$ is the probability associated with the outcome $x_i$.

C. Expected Utility of Homogenous K-Concurrent Lotteries

PROPOSITION 6. Let X={x1, ..., xn} be a set of discrete variables. Let L={$L^1, \ldots, L^n$} be a set of lotteries defined over X where each Li is a simple lottery over variable $x_i$. The expected utility of L is computed by Equation 500 using Equation 400 as follows:

$$EU(L) = \sum_{i=1}^{n} EU(L^i). \qquad \text{(Eq. 500)}$$

The EU may also be computed if variables are associated with relative importance as performance indicators in the balanced scorecards.

PROPOSITION 7. Let X={$x_1, \ldots, x_n$} be a set of discrete variables and let $\Omega=\{\omega_1, \ldots, \omega_n\}$ be a set of weights where each $\omega_i$, (1<i<n) is the relative importance of the $i^{th}$ variable in X and sum of $\omega_i=1$ (with i varying from 1 to n). Let L={$L^1, \ldots, L^n$} be a set of lotteries defined over X where each $L^i$ is a simple lottery over variable $x_i$. The expected utility of L is computed by Equation 600 as follows:

$$EU(L) = \sum_{i=1}^{n} \omega_i EU(L^i). \qquad \text{(Eq. 600)}$$

D. Preference Relation Homogenous K-Concurrent Lotteries

THEOREM 1. (Expected Utility Theorem) A preference relation $\succ$ on the space of simple lotteries L satisfying the continuity and independence axiom admits a utility representation of the expected utility form such that for any two lotteries p, q belonging to L, the following holds as described in Equation 700:

$$p \succ q \leftrightarrow \sum_{x \in supp(x)} u_x p(x) > \sum_{\notin supp(q)} u_x q(x). \qquad \text{(Eq. 700)}$$

That is, a lottery p is preferred to lottery q, if and only if, the expected utility of p is greater than the expected utility of q.

THEOREM 2. Let L be space of simple lotteries defined over a set of discrete variables. A preference relation ≻ on the space of homogeneous k-concurrent lotteries $C^k$ defined over L admits a utility representation of the expected utility form such that for any two lotteries k, l belonging to $C^k$, the following holds as described in Equation 800:

$$k \succ l \Leftrightarrow \Sigma EU(k^i) \text{ where } k^i \in \text{supp}(k) > \Sigma EU(l^i) \text{ where } l^i \in \text{supp}(l) \quad \text{(Eq. 800)}$$

where $k^i$ denotes the $i^{th}$ lottery in the concurrent lottery k and $l^i$ denotes the $i^{th}$ lottery in the concurrent lottery l. Theorem 2 shows that the preference relationship over a set of a k-concurrent lottery can be represented by the expected utility function as determined in Proposition 7. Therefore, the utility functions used to compare alternatives under uncertainty in light of balanced scorecard take the expected utility form expressed in Proposition 7.

V. Method for Comparing Alternatives Under Risk Based on Balanced Scorecard

The results on concurrent lotteries are integrated into a method for comparing alternatives under risk, as illustrated in the flow chart described with reference to FIG. 5. In a particular embodiment, the method may be used to compare one or more alternatives from the set of alternatives 312 by assessing the impact of these alternatives on the set of performance indicators 330, and hence on the set of balanced scorecards 350. Let K={κ1, . . . , κn} be a set of performance indicators and let S be a scorecard defining objectives to be achieved over K.

At step 510, a causality framework that models the relationship between alternatives and consequences is provided. In a particular embodiment, the causality framework defines the relationships between an alternative (Ai) of the set of alternatives 312 and at least one performance indicator of a set of performance indicators 330. Additional detail of the causality framework is described with reference to FIG. 6. At step 520, a k-concurrent lottery ($L^i$) associated with the alternative (Ai) is conducted, the alternative (Ai) having consequences over k ones of the set of performance indicators. At step 530, the k-concurrent lottery ($L^i$) is homogenized (as described in Proposition 5) over the set of performance indicators if the k ones is less than a number of the set of performance indicators. At step 540, an expected utility of the k-concurrent lottery ($L^i$) for each one of the set of alternatives is computed as described in Proposition 7. At step 550, one alternative is selected from the set of alternatives 312, the selection occurring in accordance with a selection criteria based on the expected utility. The selection criteria may include selection functions such as a minimum, a maximum, greater than, less than, and other criteria. It is understood that various steps described above may be added, omitted, combined, altered, or performed in different orders.

Benefits of the tools and techniques for comparing alternatives under risk described herein enable a decision maker to connect alternatives with their impact on a balanced scorecard. For example, if a server goes down and a decision maker needs to assess what alternative to opt for from a set of alternatives, e.g., repair it now, repair it tomorrow, or wait for the next maintenance cycle. The tools and techniques described herein present the decision maker with the three alternatives along with their impact on the various objectives and performance indicators for assessment Repair now may have a positive impact on "up time" objective but may require allocating a specific resource, e.g., engineer being allocated to another task, thereby increasing the cost associated with this alternative, and thus having a negative impact of "cost of delivery" objective. Repair tomorrow may not be favorable to the "up time" objective but may have a positive effect on the "cost of delivery" objective. Lastly, the wait for maintenance window alternative may not be favorable to the "up time" objective but may be favorable to the "cost of delivery" objective. While selecting an alternative, the tools and techniques described herein advantageously provide a declarative and analytical framework to support the analysis and selection by providing clear consequences associated with the alternatives.

Figure 6:
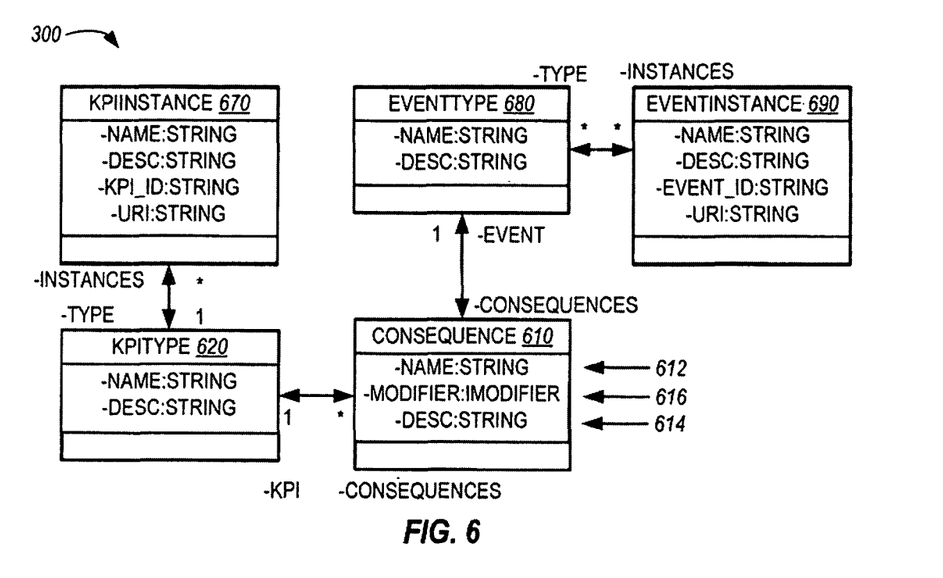
FIG. 6 illustrates an exemplary representation of a causality model described with reference to FIG. 3 using a unified modeling language (UML), according to an embodiment.

VI. An Open Model for Expressing Declaratively Casual Relationships Between Events and Performance Indicators FIG. 6 illustrates an exemplary representation of a causality model 300 described with reference to FIG. 3 using a unified modeling language (UML), according to an embodiment. As described earlier, the causality model 300 is described as being open because the framework provides for different styles of consequences to be expressed through the concept of a 'modifier'. That is, a modifier is essentially a probability distribution expressed over the range of the performance indicators or KPI's. Therefore, a consequence expresses how events are likely to modify the values of KPI's. It is understood that the causality model 300 may also be implemented using other tools and techniques, such as the Resource Description Framework (RDF). The RDF may include extensions such as RDF Schema and languages such as the RDF Ontology Web Language (RDF/OWL).

The causality model 300 includes an EventInstance 690 module coupled to an EventType 680 module, a Consequence 610 module coupled to the EventType 680 module, a KPIType 620 coupled to the Consequence 610 module, and the KPIType 620 module coupled to a KPIInstance 670 module. Relations between the coupled modules may be 1 to many (indicated by 1 and *) or many to many (indicated by * and *). EventInstance 690 is capable instantiating multiple instances of the event types. Each type of the event that is instantiated is the EventType 680. The EventType 680 may include multiple consequences, including a consequence 610. The KPIInstance 670 is capable of generating an instance KPIType 620. The consequence 610 has a name 612, a description 614 and an IModifier 616, which is an interface that expresses how a consequence modifies the associated performance indicator KPIType 620. Multiple ones of the consequences may affect the same KPIType 620. If the KPIType 620 is of discrete nature, then the IModifier 616 associated with the consequence will be a discrete modifier. Alternatively, if the KPIType 620 is of continuous nature, then the IModifier 616 associated with the consequence will be a continuous modifier. A modifier is essentially a probability distribution expressed over the range of the KPI. Consequences are associated with EventTypes. An EventInstance can have multiple EventTypes. The EventType 680 and the KPIType 620 can have super-type and sub-type relationships.

Figure 7:
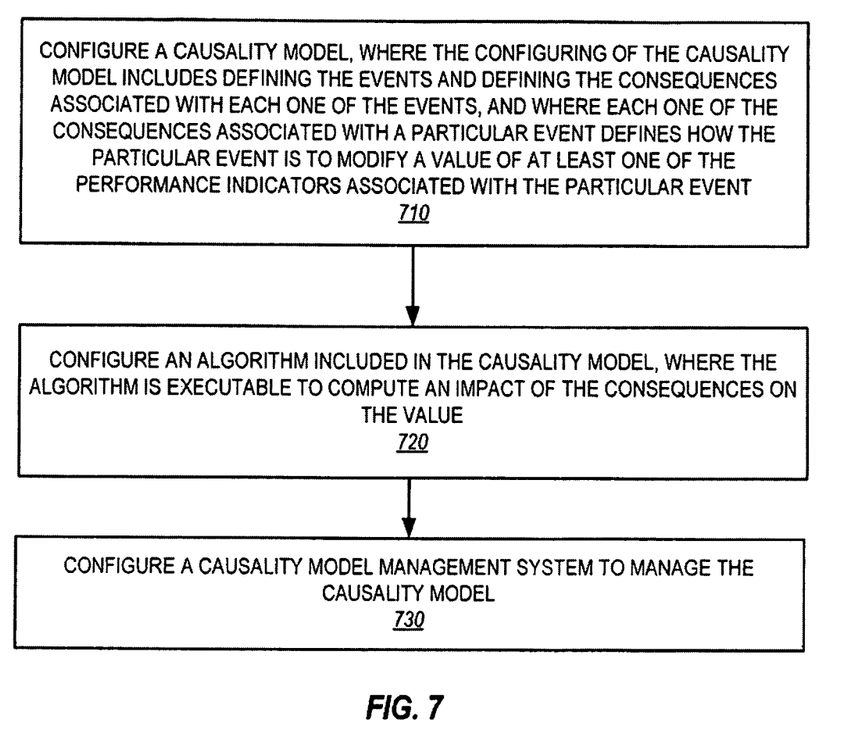
FIG. 7 is a flow chart of a method for modeling consequences of events on performance indicators, according to an embodiment.

FIG. 7 is a flow chart of a method for modeling consequences of events on performance indicators, according to an embodiment. In a particular embodiment, the method may be used to model the consequences of the set of events 320 on the set of performance indicators 330. At step 710, a causality model is configured. The configuration of the causality model includes defining the events and defining the consequences associated with each one of the events. Each one of the consequences, the consequences being associated with a particular event, defines how the particular event is to modify a value of at least one of the performance indicators associated with the particular event. At step 720, a process included in the causality model is configured, the process being executable on a computer to determine an impact of the consequences on the value. At step 730, a causality model management system is configured to manage the causality model. Additional detail of the causality model management system is described with reference to FIG. 8. It is understood that various steps described above may be added, omitted, combined, altered, or performed in different orders.

Figure 8:
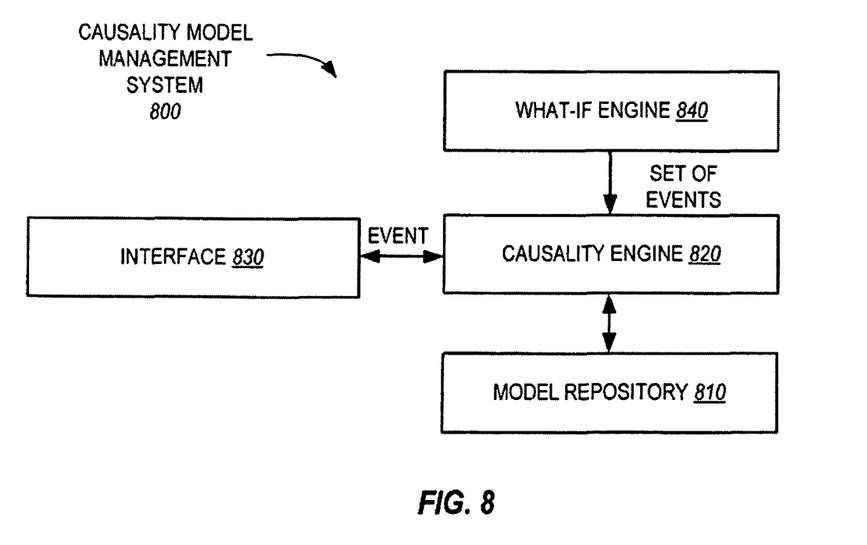
FIG. 8 is a block diagram illustrating a causality model management system, according to an embodiment.

FIG. 8 is a block diagram illustrating a causality model management system 800, according to an embodiment. The causality model management system 800 may be used to configure and operate the causality model used for modeling consequences of events on performance indicators. The causality model management system 800 includes a model repository 810 to store instances of the causality model 300, a causality engine 820 to embody the algorithm, an interface 830 to communicate with other systems, and a what-if engine 840 to simulate the consequences associated with selected ones of the events.

Figure 9:
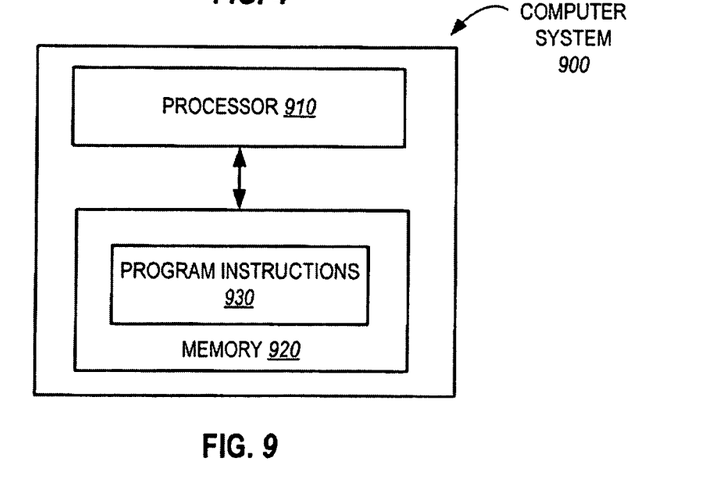
FIG. 9 illustrates a block diagram of a computer system, according to an embodiment.

FIG. 9 illustrates a block diagram of a computer system 900, according to an embodiment. The computer system 900 includes a processor 910 coupled to a memory 920. The memory 920 is operable to store program instructions 930 that are executable by the processor 910 to perform one or more functions. It should be understood that the term "computer system" is intended to encompass any device having a processor that is capable of executing program instructions from a memory medium. In a particular embodiment, the various functions, processes, methods, and operations described herein may be implemented using the computer system 900. For example, the causality model 300, the balanced scorecard 100, the causality model management system 800 and similar others may be implemented using the computer system 900.

The various functions, processes, methods, and operations performed or executed by the system 900 can be implemented as the program instructions 930 (also referred to as software or simply programs) that are executable by the processor 910 and various types of computer processors, controllers, central processing units, microprocessors, digital signal processors, state machines, programmable logic arrays, and the like. In an exemplary, non-depicted embodiment, the computer system 900 may be networked (using wired or wireless networks) with other computer systems.

In various embodiments the program instructions 930 may be implemented in various ways, including procedure-based techniques, component-based techniques, object-oriented techniques, rule-based techniques, among others. The program instructions 930 can be stored on the memory 920 or any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Novel features believed characteristic of the present disclosure are set forth in the appended claims. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of data models are described. The illustrative system for decision making under uncertainty can be used with any suitable data models. The illustrative techniques may be used with any suitable data processing configuration and with any suitable servers, computers, and devices. In the claims, unless otherwise indicated the article "a" is to refer to "one or more than one".

What is claimed is:

1. A method for modeling consequences of events on performance indicators, the method comprising:

defining, with a processing device, alternative sets of events and defining consequences associated with corresponding ones of the events, the consequences associated with a particular event to define how the particular event is to modify a value of at least one performance indicator associated with the particular event;

homogenizing at least two of the alternative sets of events using a degenerate lottery;

computing, with the processing device, utilities of the at least two homogenized alternative sets based on the at least one performance indicator; and selecting between the at least two homogenized alternative sets based on the utilities.

2. The method of claim 1 further comprising:

configuring a causality model management system to manage a causality model including the events, the consequences, and the performance indicators, the causality model management system comprising a model repository to store instances of the causality model, a causality engine, an interface to communicate with other systems, and a what-if engine to simulate the consequences associated with selected ones of the events.

3. The method of claim 2, wherein the causality model is an open model to provide the consequences to be expressed through a modifier.

4. The method of claim 3, wherein the modifier is a probability distribution expressed over a range of the performance indicators.

5. The method of claim 2, wherein the causality model is implemented in a unified modeling language, an RDF Schema, an ROF/OWL, or a combination thereof.

6. A computer system for modeling consequences of events on performance indicators, the computer system comprising:
a processor; and
a tangible computer readable storage medium storing instructions executable by the processor, the instructions, when executed, to cause the processor to at least:
define consequences associated with corresponding ones of events in alternative sets of events, wherein the consequences associated with a particular event define how the particular event is to modify a value of at least one performance indicator associated with the particular event;
homogenize at least two of the alternative sets of events using a degenerate lottery;
compute utilities of the at least two homogenized alternative sets based on the at least one performance indicator; and
select between the at least two homogenized alternative sets based on the utilities.

7. The computer system according to claim 6, wherein the instructions are further to cause the processor to:
configure a causality model management system to manage a causality model including the events, the consequences, and the performance indicators, the causality model management system comprising a model repository to store instances of the causality model, a causality engine, an interface to communicate with other systems, and a what-if engine to simulate the consequences associated with selected ones of the events.

8. The computer system according to claim 7, wherein the causality model is an open model to provide the consequences to be expressed through a modifier.

9. The computer system according to claim 8, wherein the modifier is a probability distribution expressed over a range of the performance indicators.

10. The computer system according to claim 7, wherein the instructions for the causality model are implemented in a unified modeling language, an RDF Schema, an ROF/OWL, or a combination thereof.

11. A non-transitory computer readable storage medium comprising computer readable instructions which, when executed, cause a computer to at least:
define consequences associated with corresponding events in alternative sets of events, the consequences associated with a particular event to define how the particular event is to modify a value of at least one performance indicator associated with the particular event;
homogenize at least two of the alternative sets of events using a degenerate lottery;
compute utilities of the at least two homogenized alternative sets based on the at least one performance indicator; and
select between the at least two homogenized alternative sets based on the utilities.

12. The computer readable storage medium of claim 11, wherein the instructions further cause the computer to:
configure a causality model management system to manage a causality model, the causality model management system comprising a model repository to store instances of the causality model, a causality engine, an interface to communicate with other systems, and a what-if engine to simulate the consequences associated with selected ones of the events.

13. The computer readable storage medium of claim 12, wherein the causality model is an open model to provide the consequences to be expressed through a modifier.

14. The computer readable storage medium of claim 13, wherein the modifier is a probability distribution expressed over a range of the performance indicators.

15. The method of claim 1, wherein computing a utility of an alternative set is based on a risk classification of the utility with respect to the at least one performance indicator.

16. The computer system of claim 6, wherein the instructions are to cause the computer to compute the utility of the alternative set of the consequences based on a risk classification of the utility with respect to the at least one performance indicator.

17. The computer readable storage medium of claim 11, wherein the instructions are to cause the computer to compute the utility of the alternative set of the consequences based on a risk classification of the utility with respect to the at least one performance indicator.

18. The method of claim 1, wherein selecting between the at least two homogenized alternative sets is based on a preference relation between concurrent lotteries representative of the at least two homogenized alternative sets.

19. The computer system of claim 6, wherein selecting between the at least two homogenized alternative sets is based on a preference relation between concurrent lotteries representative of the at least two homogenized alternative sets.

20. The computer readable storage medium of claim 11, wherein the instructions cause the computer to select between the at least two homogenized alternative sets based on a preference relation between concurrent lotteries representative of the at least two homogenized alternative sets.

* * * * *